UNITED STATES PATENT OFFICE.

ADOLF STEINDORFF AND ROBERT WELDE, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

FINELY-DIVIDED VAT DYESTUFFS AND PROCESS OF MAKING SAME.

1,145,934. Specification of Letters Patent. Patented July 13, 1915.

No Drawing. Application filed April 9, 1914. Serial No. 830,748.

*To all whom it may concern:*

Be it known that we, ADOLF STEINDORFF, Ph. D., chemist, and ROBERT WELDE, Ph. D., chemist, citizens of the Empire of Germany, residing at Höchst-on-the-Main, Germany, have invented certain new and useful Improvements in Finely-Divided Vat Dyestuffs and Processes of Making Same, of which the following is a specification.

We have found that by treating vat-dyestuffs derived from the dihydro-1.2.2'1'-anthraquinonazin series, for instance the commercial indanthrene RS of the formula—

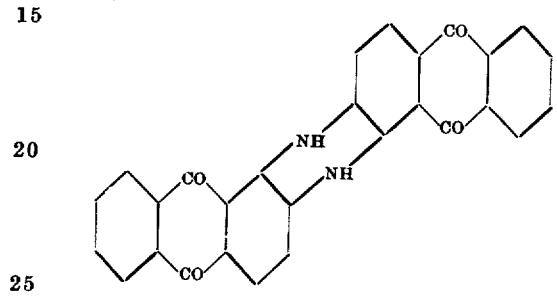

and indanthrene GC, etc., with more or less highly-concentrated sulfuric acid, the quantity of which should be so moderate as to be insufficient for the solution of the dyestuffs at ordinary temperature, it is possible to convert the indanthrenes, which are generally of a very coarse consistence (such for instance as the indanthrene as obtained directly from the fusion or after being purified) into an extremely finely-subdivided form suitable for various purposes, particularly for the preparation of pigment-dyes which possess a greater covering power than the commercial indanthrenes and the product obtainable by treatment with glucose and alkali; when using crude indanthrene it may be purified during this operation.

In the following description we comprise under the term "sulfuric acid": sulfuric acids of various strength, viz: fuming sulfuric acid as well as monohydrate, concentrated sulfuric acid and the various strongly-diluted sulfuric acids.

When the indanthrene is mixed and stirred in the cold with moderate quantities of highly concentrated sulfuric acid, that is to say, with a quantity insufficient to dissolve the indanthrene in the cold, for instance with five times the quantity of monohydrate, said indanthrene can be transformed into a solid sulfate which separates from the mass. The thus obtained sulfate-magma may be dissociated by adding water whereby a finely-divided indanthrene dyestuff is obtained. The indanthrene, thus converted, can be used for various technical purposes according to the manner in which it has been prepared, that is to say, according to the working conditions chosen (for instance lower or higher temperature, lower or higher concentrations, etc.) *i. e.* accordingly as the sulfate has separated in a more finely or in a coarser crystalline form, or in an amorphous form, the latter being obtained when the operation is performed quickly and at a low temperature.

When the indanthrene is mixed and stirred, for instance at about 0° or —5° C. with five times the quantity of monohydrate or sulfuric acid of 66° Bé., it will be completely transformed with change of the color; thus a yellowish-green magma is obtained consisting of the separated indanthrene-sulfate. If this sulfate-magma is introduced into ice-water, the blue pseudomorphous indanthrene corresponding to the indanthrene-sulfate is obtained, its formation being due, as we have found, to a pseudomorphosis of crystals. This pseudomorphous indanthrene exhibits, when seen through a microscope, the same form of the minute individual particles as the sulfate. The sulfates obtained generally show crystals which are the smaller (being sometimes even amorphous) the quicker the operation for preparing them is performed and the lower the temperature employed. Simultaneously with the above operation the indanthrene can be purified in the following simple and easy manner: Impure indanthrene, for instance indanthrene RS powder, crude indanthrene, etc., is treated with concentrated sulfuric acid or monohydrate, the quantity of which should be so moderate as to be insufficient for the solution of the dyestuffs at ordinary temperature. The yellowish-green magma of indanthrene sulfate thus obtained is filtered off and the indanthrene-sulfate remaining on the filter is dissociated with ice-water; thus an indanthrene is produced which not only shows a good division, but which also gives cleaner and more even prints than the parent indanthrene. In connection with the foregoing procedure we have furthermore found that by mixing not entirely pure indanthrene, for instance commercial indanthrene RS, and particularly crude-indanthrene, with sulfuric acid of lower concentration, for instance with one of 60° Bé., a bluish-green magma is obtained, and that, although this magma turns yellowish-green, there is only a partial formation of indanthrene sulfate, the substances accompanying the indanthrene, particularly flavanthrene, dissolving to a yellowish-brown solution while pure indanthrene remains.

On the basis of the foregoing observations there can also be carried out a process for purifying indanthrene which may at the same time be utilized for obtaining indanthrene in the desired subdivided condition, that is to say, either in fine or coarse crystals, or in an amorphous colloid-like form, the procedure being as follows: Crude indanthrene is treated with concentrated sulfuric acid to transform it into the yellowish-green indanthrene sulfate which separates; to the magma thus obtained is then added a small quantity of water so as to obtain an acid of a lower concentration viz. of about 75–80 per cent. strength, whereupon the indanthrene remains separated in the mass, partly as such and partly in the form of a sulfate, while the impurities still become dissolved. Finally the mass is separated from the mother-liquor by filtration. The remaining indanthrene, i. e. the product which is partly composed of indanthrene and partly of indanthrene-sulfate—according to the grades of the dilution used—is dissociated with ice-water and washed.

Instead of treating first with concentrated sulfuric acid and then diluting to a sulfuric acid of 60 or 75 per cent. strength and filtering, the indanthrene may be treated directly with sulfuric acid diluted to a strength of about 60–80 per cent., and then freed from the acid by washing. By thus treating coarsely divided indanthrene-dyestuffs (no matter whether they are coarsely amorphous or coarsely crystalline i. e. conglomerated), for instance by treating commercial indanthrene RS or GC powder, or indanthrene obtained from the solution after fusion, the said dyestuffs are converted into very finely divided indanthrene-dyes; for we have found that coarsely amorphous indanthrene,—as it is obtainable by pouring a solution of indanthrene in a large quantity of concentrated sulfuric acid into water and filtering,—can be transformed into finely divided indanthrene consisting of minute crystals, by treatment with sulfuric acid of low concentration (for instance one of 58°Bé.) so that there is substantially no formation of indanthrene-sulfate. The dyestuffs thus obtained are of a very good yield as pigment-dyes as compared with the already known commercial brands. The ordinary dibromo-indanthrene heretofore known did not exist in the form of crystalline particles.

We have furthermore found that, even when using an acid of a still lower strength and working at a higher temperature, for instance at 100–120° C., all the indanthrene dyestuffs, i. e. those which show no crystalline but an amorphous structure, and also those in which a more or less coarse structure is discernible, can be transformed from the coarse amorphous or crystalline initial powder-form into a magma of very fine, uniform crystalline needles. The working up of this magma is also in this case preferably effected by diluting with ice and filtering the dyestuff; and if an impure, crude indanthrene is used for the transformation, it is advantageous to filter the transformed magma directly, or, if desired, after further dilution with sulfuric acid, whereby the impurities will be retained in the sulfuric acid lye, the residue being then washed with water.

The following examples will illustrate our invention, the parts being by weight.

Example I: 100 parts of indanthrene RS powder are mixed and stirred with 500 parts of monohydrate (1.838 specific gravity) cooled down to about 0° C. or below. The yellowish-green magma thus obtained containing the sulfate of the indanthrene separated, is dissociated with ice-water, which should advantageously be done quickly, so that the dissociation occurs before the minute sulfate crystals are transformed into coarser crystals, the indanthrene-dyestuff is then filtered off and freed from the acid by washing.

Example II: 100 parts of indanthrene RS powder are mixed and stirred with 500 parts of sulfuric acid of 66° Bé., (1.84 specific gravity), after having stirred for a short time the yellowish-green sulfate which separates it is dissociated with ice-water; the further operation is performed as indicated in Example I. If in the place of the indanthrene RS other brands, for instance the halogenated indanthrenes (indanthrene GC, etc.) are used and treated in the above-described manner with sulfuric acid, either at a low temperature or at 40° C., there will also separate sulfates, and after dissociating the pulpy magma in sulfuric acid with water, the indanthrene dyestuff is obtained in a finely-divided condition. When using slightly fuming acid it is advantageous to work below 0° C.

Example III: 100 parts of indanthrene crude powder or, for instance. indanthrene RS are mixed and stirred with 700 parts of sulfuric acid of 66° Bé. (1.84 specific gravity) cooled down to 0° C. The magma thus obtained becomes brownish-yellow with formation of indanthrene sulfate. After having gradually added about 60 parts of ice, the color of the magma turns green in consequence of the partial dissociation of the indanthrene sulfate; this magma is then slightly heated and filtered off. The indanthrene-dyestuff remaining on the filter is washed by treating it with a small quantity of sulfuric acid of 60° Bé. The impurities of the indanthrene, for instance the flavanthrene, remain dissolved in the yellowish-brown lye. It is advantageous to dissolve in the sulfuric acid to be used for the solution, small quantities (about 20 per cent. or less of indanthrene) of additional organic agents (for instance aromatic or other sulfonic acids, etc.) such as have been found, according to U. S. Patents Nos. 1,058,019, 1,057,886 and 1,057,887, to be suitable for the transformation of indigo into finely-subdivided indigo; thus it is of advantage to add sodium benzylsulfanilate or the like. Such admixtures facilitate the separation of the indanthrene sulfate in a very finely-divided condition and thus the production of an extremely finely-divided dyestuff which may also be used as a pigment dye.

Example IV: One part of indanthrene powder is introduced into 5 parts of concentrated sulfuric acid of 1.84 specific gravity and heated to about 100° C. so as to give a solution. This solution is allowed to cool, while stirring it, whereupon the sulfate separates as crystals which are filtered off, washed with a small quantity of sulfuric acid and dissociated by introducing them into ice-water. The indanthrene thus obtained is crystalline and yields very pure tints.

Example V: 100 parts of indanthrene RS are ground in a ball-mill with 1400 parts of sulfuric acid of 58° Bé. (1.67 specific graity) for about two hours at 20° C. The magma which is at first thin-liquid soon becomes very thick. To this blue magma 1400 parts of ice are added and the indanthrene dyestuff is filtered off. The indanthrene thus obtained shows a very fine, pigment-like sub-division.

Example VI: 100 parts of indanthrene in amorphous form, as obtainable by dissolving indanthrene in highly concentrated sulfuric acid (1.838 specific gravity) and rapidly precipitating with water, or by blowing air in the cold solutions of indanthrene in the vat or from the fusion, are mixed and stirred in the cold with 1500 parts of sulfuric acid of 58° Bé. until the coarsely amorphous dyestuff-lumps have become divided into very minute dyestuff-particles, which, when seen through a microscope, appear to be even smaller than tubercle bacilli. The operation may even be carried out while gently heating, particularly when it is intended to obtain the indanthrene in a somewhat different condition. The resulting magma is washed with water to remove the sulfuric acid. The indanthrene dyestuff thus obtained is of an extremely fine division and possesses an extraordinary power of yielding pigments, which is due to the fact that the individual crystalline particles of the new product are smaller than tubercle bacilli, which is not the case with any of the indanthrene-dyestuffs hitherto manufactured or previously described in literature.

Example VII: 20 parts of dibromindanthrene (commercial indanthrene GC) are heated in the form of a paste with 300 grams of sulfuric acid of 60° Bé. (1.71 specific gravity) for several hours to 80–90° C. The coarsely amorphous lumps of the dyestuff-paste are thus transformed into small uniform crystalline needles. There may be obtained extremely microcrystalline or more coarsely crystalline products according to the temperature and the concentration of the acid used. For working up the resulting magma the acid is removed by washing with water and the dyestuff is filtered off and made into a paste or evaporated into a powder.

Example VIII: 100 parts of indanthrene powder, either in a coarse crystalline form, as obtained, for instance, by solution and crystallization from concentrated sulfuric acid, or in an amorphous form, are mixed and stirred for some hours at 100–120° C. with 1400 parts of sulfuric acid of 75 per cent. strength (1.67 specific gravity). After cooling, 100 parts of ice are added to the magma and the dyestuff is isolated by filtration. The finely-divided indanthrene dyestuff thus obtained is in the form of fine uniform needles.

Example IX: 100 parts of indanthrene GC powder are mixed and stirred for one hour at 40° C. with 1000 parts of sulfuric acid of 60° Bé.; (1.71 specific gravity) after adding 1000 parts of ice, the dyestuff is filtered off. The indanthrene-dyestuff thus obtained consists of very fine uniform crystals of a blue color and a pigment-like structure.

Example X: 100 parts of indanthrene powder crude, or RS powder, are well mixed and stirred for one hour at 40–50° C. with 1000 parts of sulfuric acid of 75 per cent. strength (1.71 specific gravity). The magma thus obtained is filtered off and washed by treating it with sulfuric acid. The dyestuff thus obtained is freed from the acid; it dyes pure tints and gives very even prints, which proves its fine and uniform division.

Having now described our invention what we claim is:

1. The process of manufacturing finely-divided vat-dyestuffs of the dihydro-1.2.2'.1'-anthraquinonazin (indanthrene) series, which consists in treating said dyestuffs first with a quantity of a sulfuric acid insufficient to dissolve the indanthrene in the cold, and then with water.

2. The process of manufacturing finely-divided vat dyestuffs of the indanthrene series, which consists in treating said dyestuffs first with sulfuric acid of 66° Bé. to 48.1° Bé., i.e., 1.841 to 1.5 specific gravity, in quantity insufficient for the solution of the indanthrenes at ordinary temperature, and then with water.

3. The process of manufacturing finely-divided vat-dyestuffs of the indanthrene series, which consists in transforming said dyestuffs from an amorphous to coarsely crystalline form into a finely crystalline form by heating it with sulfuric acid of about 1.67 to 1.6 specific gravity in quantity insufficient for the solution of the indanthrenes at ordinary temperature and then treating the magma thus obtained with water to remove the sulfuric acid.

4. The process of manufacturing finely-divided vat-dyestuffs of the indanthrene series, which consists in treating said dyestuffs with a sulfuric acid in quantity sufficient for the solution of them at ordinary temperature, filtering off and treating the residue with water.

5. The process of manufacturing finely-divided vat-dyestuffs of the indanthrene series, which consists in treating impure indanthrene dyestuffs with a highly concentrated sulfuric acid, and then diluting with a small quantity of water so that there remain the undissolved indanthrene-dyestuffs and a sulfuric acid not below 1.5 spec. grav. which is still capable of dissolving the impurities, filtering off the residue and treating the latter with water.

6. As new products, finely divided pigment dyes of the indanthrene series showing the reactions of the dyestuffs of this class, but being distinguished from them by exhibiting, when seen under the microscope, uniform, severally-visible particles, not exceeding about the size of tubercle bacilli and by possessing, when spread as a glue-water color (size paint-color), a greater covering power than the commercial indanthrenes and the product obtainable by treatment with glucose and alkali.

7. As a new product, finely divided dibromo-indanthrene in a new physical form, showing the reactions of the dibromo-indanthrene, however being distinguished from the same by exhibiting, when seen under the microscope, uniform severally-visible small crystalline particles.

In testimony whereof, we affix our signatures in presence of two witnesses.

ADOLF STEINDORFF.
ROBERT WELDE.

Witnesses:
 JEAN GRUND,
 CARL GRUND.

It is hereby certified that in Letters Patent No. 1,145,934, granted July 13, 1915, upon the application of Adolf Steindorff and Robert Welde, of Höchst-on-the-Main, Germany, for an improvement in "Finely-Divided Vat Dyestuffs and Processes of Making Same," errors appear in the printed specification requiring correction as follows: Page 3, line 43, for the word "graity" read *gravity;* page 4, lines 27–28, claim 4, for the word "sufficient" read *insufficient;* and that the said Letters Patent should be read with these corrections therein that the same may conform to the record of the case in the Patent Office.

Signed and sealed this 12th day of October, A. D., 1915.

[SEAL.]

R. F. WHITEHEAD,

*Acting Commissioner of Patents.*

Cl. 8—1.